United States Patent [19]

Rosenski et al.

[11] Patent Number: 5,319,020

[45] Date of Patent: Jun. 7, 1994

[54] REDISPERSIBLE WATERBORNE PRESSURE SENSITIVE ADHESIVE POLYMER

[75] Inventors: Josephine M. Rosenski, N. Plainfield; Atul Arora, Somerville, both of N.J.

[73] Assignee: National Starch and Chemical Investment Holding Corporation, Wilmington, Del.

[21] Appl. No.: 50,944

[22] Filed: Apr. 21, 1993

[51] Int. Cl.$^5$ .............................. C08K 5/06; C08J 3/02
[52] U.S. Cl. ..................................... 524/762; 524/377; 524/457
[58] Field of Search .................... 524/377, 457, 762

[56] References Cited

U.S. PATENT DOCUMENTS

| | | | |
|---|---|---|---|
| 3,441,430 | 4/1969 | Peterson et al. | 117/68.5 |
| 3,661,874 | 5/1972 | Olson | 260/33.3 |
| 3,865,770 | 2/1975 | Blake | 260/27 R |
| 3,891,584 | 6/1975 | Ray-Chaudhuri et al. | 206/27 R |
| 4,413,080 | 11/1983 | Blake | 524/187 |
| 4,442,258 | 4/1984 | Sunakawa et al. | 524/767 |
| 4,474,919 | 10/1984 | Polatajko-Lobos | 524/377 |
| 4,753,973 | 6/1988 | Hsich | 524/547 |
| 5,183,841 | 2/1993 | Bernard | 524/272 |
| 5,299,447 | 7/1993 | Miyajima et al. | 524/762 |

FOREIGN PATENT DOCUMENTS

| | | |
|---|---|---|
| 56-70077 | 6/1981 | Japan . |
| 57-61073 | 4/1982 | Japan . |
| 0074742 | 5/1983 | Japan ..................... 524/762 |

OTHER PUBLICATIONS

Adhesives Age, Sept. 1991, Roland R. Milker, et al., 30–37, *Repulpable Splicing Tapes Help Meet Environmental Concerns.*

Primary Examiner—Paul R. Michl
Assistant Examiner—Peter Szekely
Attorney, Agent, or Firm—Jane E. Gennaro

[57] ABSTRACT

This invention is an emulsion polymer for use as a redispersible pressure sensitive adhesive and a process for making the emulsion polymer. The polymer is the emulsion polymerization reaction product of one or more neutralized ethylenically unsaturated carboxylic acid monomers, one or more alkyl acrylates or methacrylates, and optionally, one or more vinyl containing monomers. The carboxylic acid functionality is either neutralized before initiation of polymerization, concurrently with the polymerization, or partially before and partially during polymerization. The polymerization occurs in the presence of a polyalkylene oxide plasticizer, having a molecular weight greater than 3000. In other embodiments, the invention is the water redispersible pressure sensitive adhesive made with the polymer, and a repulpable substrate made with the polymer.

12 Claims, No Drawings

REDISPERSIBLE WATERBORNE PRESSURE SENSITIVE ADHESIVE POLYMER

This invention relates to a method for making pressure sensitive adhesives that are used on paper products and that are redispersible in water when the paper products are recycled and repulped.

During the recycling of paper products or tapes that contain pressure sensitive adhesives, the paper is slurried into water with heating and stirring to cause the paper to disintegrate into its component fibers. If an insoluble or a non-redispersible adhesive is present, the paper fibers will break away from the adhesive and the adhesive will mass into large lumps and films that eventually show up in the reformed paper as blotches and irregularities. As a result, the reformed paper has a non-uniform appearance and texture, and the blotches of adhesive cause ink to bleed and run on the reprinted page. Water-soluble pressure sensitive adhesives, which are removed with the waste water in the repulping process, have been developed to correct this problem, but in turn present other problems.

Many pressure sensitive adhesive polymers are synthesized from insoluble acrylate and methacrylate monomers, which are known to give good adhesive properties. In order to make these polymers water soluble, relatively high levels of carboxylic acid are incorporated into the polymeric chain. The high level of acid needed to make the polymer water soluble also increases the humidity sensitivity of the adhesive, and this sensitivity ultimately leads to failure of the adhesive. In addition, although neutralization of the carboxylic acid functionality of these polymers is known to enhance solubility, neutralization can result in an unwanted increase in viscosity during the solution polymerization if the carboxylic acid monomers are neutralized before polymerization is initiated. It is also known that higher molecular weight polymers give better cohesive properties than lower molecular weight polymers, but higher molecular weight polymers also may cause an unwanted increase in viscosity. Thus, for practical purposes, in solution polymerization processes neutralization typically is performed after polymerization, and the molecular weight is controlled to avoid viscosity increases.

It has now been discovered that emulsions of redispersible pressure sensitive adhesives can be made that avoid the disadvantages associated with pressure sensitive adhesive solutions. The polymers of these emulsions can be synthesized with lower levels of carboxylic acid than have previously been needed for solubility, thereby avoiding humidity sensitivity in the final adhesive. They also can be made to higher molecular weights for improved cohesive properties. Further, in the emulsion polymerization employed in this invention, neutralization of the carboxylic acid monomer can take place either before or after polymerization, without causing an unwanted increase in viscosity. The adhesives are redispersible into fine microparticles during repulping processes, and these microparticles are easily adsorbed onto repulped paper without impairing the uniformity and quality of the paper or causing the printing ink to bleed.

SUMMARY OF THE INVENTION

This invention is a method for preparing a polymer for use as a water redispersible pressure sensitive adhesive that comprises providing as monomers (a) one or more ethylenically unsaturated carboxylic acid monomers present in an amount to give 10–75, preferably 40–60, milliequivalents of carboxylic acid functionality per 100 grams of total monomer content, (b) 60–85 parts by weight of one or more ($C_1$–$C_{12}$) alkyl acrylate or methacrylate monomers, and (c) optionally, 5–30 parts by weight of one or more vinyl containing monomers; first neutralizing 50–100% of the acidity of the carboxylic acid monomers, and then emulsion polymerizing the monomers in the presence of 10–50 parts per hundred parts of monomer of a polyalkylene oxide alcoholic plasticizer. An alternative method comprises concurrently neutralizing 50–100% of the acidity of the carboxylic acid monomers while emulsion polymerizing the monomers in the presence of 10–50 parts per hundred parts of monomer of a polyalkylene oxide plasticizer. Another alternative comprises first neutralizing about 10–50% of the acidity of the carboxylic acid monomers; then concurrently neutralizing the remaining carboxylic acid monomers to a total of 50–100% of the acidity while emulsion polymerizing the monomers in the presence of 10–50 parts per hundred parts of monomer of a polyalkylene oxide plasticizer. The alcoholic plasticizer is used to contribute to redispersibility and will have a molecular weight greater than 3000, preferably greater than 5000. The lower molecular weight plasticizers are not as effective in contributing to redispersibility.

In other embodiments, this invention is a water redispersible adhesive made by this method and a substrate coated with the water redispersible adhesive.

DETAILED DESCRIPTION OF THE INVENTION

The base polymer for the redispersible pressure sensitive adhesives comprises the polymerization reaction product of one or more ($C_1$–$C_{12}$) alkyl acrylate or methacrylate monomers (in which $C_1$–$C_{12}$ refers to the alcohol from which the ester is synthesized) with one or more fully or partially neutralized ethylenically unsaturated carboxylic acid monomers present in an amount to give 10–75, preferably 40–60, milliequivalents of carboxylic acid functionality per 100 grams of total monomer content. In another embodiment, the base polymer comprises the reaction product of 60–85 parts by weight of one or more ($C_1$–$C_{12}$) alkyl acrylate or methacrylate monomers, 5–30 parts by weight of one or more vinyl containing monomers, and one or more fully or partially neutralized ethylenically unsaturated carboxylic acid monomers present in an amount to give 10–75, preferably 40–60, milliequivalents of carboxylic acid functionality per 100 grams of total monomer content. The exact parts by weight of the carboxylic acid monomer will vary with the molecular weight of the monomer and the number of milliequivalents used.

In general terms, less carboxylic acid functionality is required in these polymer emulsions than in solution polymers to obtain water redispersibility. Water redispersibility is enhanced by neutralizing the carboxyl groups and the percentage neutralization is directly related to the amount of carboxylic acid monomer polymerized into the polymer. The higher the percentage of unsaturated carboxylic acid monomer polymerized into the polymer, the less neutralization that will be needed to insure water redispersibility. Usually, the carboxylic acid functionality will be neutralized in the range of 50–100%, which range is intended to include each numerical value within the range, and every smaller range within that range. The neutralizing agents suitable for use are the alkali metal hydroxides, of which the preferred is sodium hydroxide, and ammonium hydroxide. The preferred neutralizing agent is ammonium hydroxide.

Carboxylic acid monomers suitable for polymerization into the adhesive polymer are the unsaturated $C_3$-$C_8$ monocarboxylic acids, such as acrylic, methacrylic and crotonic acids; and unsaturated $C_4$-$C_{12}$ dicarboxylic acids, such as maleic, itaconic, and fumaric acids, and their mono($C_1$-$C_{12}$) alkyl esters and anhydrides, and combinations of those. The preferred carboxylic acid monomers are acrylic acid, and monooctyl maleate.

It will be recognized by those skilled in the art that the acrylate and methacrylate monomers used to make the water redispersible adhesives of this invention are known for their pressure sensitive properties, and it is within the expertise of those skilled in the art to choose particular monomers in particular amounts to obtain a specific balance of pressure sensitive properties. For example, it is known that the shorter the chain length of the alcohol from which the acrylate monomer is derived, the firmer the resultant pressure sensitive adhesive, and conversely, the longer the chain, the softer the adhesive. Thus, the use of higher percentages of short-chain acrylates in the adhesive polymer tends to increase the hardness of the adhesive, decreasing its tackiness.

The acrylate and methacrylate monomers that are suitable for polymerization into the adhesive polymer are ($C_1$-$C_{12}$) alkyl acrylates and methacrylates, and combinations of those. The preferred monomers are butyl acrylate and 2-ethyl hexyl acrylate. These monomers are incorporated into the polymer in an amount of 60-85 parts by weight of the polymer, preferably 70-80 parts by weight.

Vinyl monomers are incorporated into the polymer adhesive to achieve specific properties, for example, styrene to increase firmness, tert-butyl styrene to increase tack, and vinyl acetate to improve adhesion. The vinyl monomers that are suitable for polymerization into the adhesive polymer are vinyl acetate, vinyl propionate, vinyl butyrate, acrylonitrile, methacrylonitrile, acrylamide, methacrylamide, styrene, ethylene, vinyl chloride, vinylidene chloride, and the ($C_1$-$C_{12}$) dialkyl esters of dibasic unsaturated $C_4$-$C_{12}$ dicarboxylic acids and combinations of those. The preferred vinyl monomers are vinyl acetate, vinyl pivalate, and styrene. The vinyl monomers are incorporated into the polymer in an amount of 5-30 parts by weight of the polymer, preferably 10-20 parts by weight.

These monomers are polymerized in the presence of a water-soluble polyalkylene oxide polymer, which acts as an alcoholic plasticizer, to increase the redispersibility of the adhesive polymer. The polyalkylene oxide polymers are present in the polymerization in the amount of 10-50 parts by weight, preferably 20-40 parts by weight per hundred parts of monomer. The preferred water-soluble polyalkylene oxide polymers are those that have molecular weight greater than 3000, and preferably greater than 5000. The use of the polyalkylene oxide plasticizer with a molecular weight greater than 3000 not only contributes to the redispersibility of the polymer, but also improves the pressure sensitive properties of the adhesive. This was unexpected because, as is known, the higher molecular weight compounds are harder and generally are used to impart anti-blocking properties and not pressure sensitive properties.

Suitable polymers are the polymerization adduct of propylene oxide or ethylene oxide with hydroxyl groups of polyhydric alcohols, such as polyethylene glycol and polypropylene glycol, or a copolymer of ethylene oxide and propylene oxide. These compounds are commercially available under the tradenames Carbowax PEG-4000, 6000, 8000, 14,000; Carbowax Methoxy PEG-5000; and PEG Glycol compound 20M, all from Union Carbide. The numbers associated with the tradenames correspond to the molecular weight. Other commercially available polymers are the high molecular weight polyetherpolyols sold under the tradenames Pluronics and Tetronics from Wyandotte Corporation.

The polymerization of the polymer can be accomplished by known procedures for polymerization in aqueous emulsion. Optionally, conventional seeding procedures can be employed to aid in controlling polymerization to achieve the desired average particle size and particle size distribution, which preferably will be in the range of 200-350 nanometers. If seeding is employed, the polymer seed will be present in amounts that correspond to about 0.1 to 4 parts by weight of the total polymer, and will range in size from about 20%-60% of the diameter of the polymer particles to be formed. The seed latex can constitute a previously prepared latex or polymer powder, or it can be prepared in situ. The monomeric composition of the seed latex can vary; however, it is preferable that it be substantially the same as that of the polymer.

The monomer or comonomers, and optionally the seed, to be employed in the preparation of the polymer are dispersed into water with agitation sufficient to emulsify the mixture. The aqueous medium may also contain a free radical polymerization catalyst, an emulsifying agent (i.e., surfactant), or other ingredients that are known and conventionally employed in the art as emulsion polymerization aids.

Suitable free radical polymerization catalysts are the catalysts known to promote emulsion polymerization and include water-soluble oxidizing agents, such as, organic peroxides (e.g., t-butyl hydroperoxide, cumene hydroperoxide, etc.), inorganic oxidizing agents(e.g., hydrogen peroxide, potassium persulfate, sodium persulfate, ammonium persulfate, etc.) and those catalysts that are activated in the water phase by a water-soluble reducing agent. Such catalysts are employed in a catalytic amount sufficient to cause polymerization. As a general rule, a catalytic amount ranges from about 0.01 to 5 parts by weight based upon the total weight of monomers to be polymerized. As alternatives to heat or catalytic compounds to activate the polymerization, other free radical producing means, such as exposure to activating radiations, can be employed.

Suitable emulsifying agents include anionic, cationic, and nonionic emulsifiers customarily used in emulsion polymerization. Usually, at least one anionic emulsifier is utilized and one or more nonionic emulsifiers may also be utilized. Representative anionic emulsifiers are the alkyl-aryl sulfonates, alkali metal alkyl sulfates, the sulfonated alkyl esters, and fatty acid soaps. Specific examples include sodium dodecylbenzene sulfonate, sodium butylnaphthalene sulfonate, sodium lauryl sulfate, disodium dodecyl diphenyl ether disulfonate, N-octadecyl disodium sulfosuccinate and dioctyl sodium sulfosuccinate. The emulsifying agents are employed in amounts to achieve adequate emulsification and to provide desired particle size and particle size distribution.

Other ingredients known in the art to be useful for various specific purposes in emulsion polymerization may be used, such as chain transfer agents, chelating agents, and those known weak acids and their salts that are commonly used to provide a buffered system at a desired pH range. A useful and suitable pH range for the polymerizations of this invention is pH 6-7.

The entire amount of the aqueous medium with polymerization additives can be present in the polymerization vessel before introduction of the monomers, or alternatively, the aqueous medium, or a portion of it, can be added continuously or incrementally during the course of the polymerization. The manner of combining the polymerization ingredients can be by various known monomer feed methods, such as, addition in a single charge of the entire amount of monomers, continuous monomer addition, or incremental monomer addition.

No matter which manner is chosen, it is preferred to neutralize the carboxylic acid monomers either before initiation of polymerization, concurrently with polymerization, or partially before and partially concurrently with polymerization. These sequences give superior adhesive and cohesive pressure sensitive properties and less grit residue than if neutralization is accomplished after polymerization. The more preferred method is to neutralize concurrently with polymerization.

Polymerization is initiated by heating the emulsified mixture with continued agitation to a temperature usually between about 50°-100° C., preferably between 60°-90° C. Polymerization is continued by maintaining the emulsified mixture at the selected temperature until conversion of the monomer or monomers to polymer has been reached.

Following polymerization, the solids content of the resulting emulsion polymer can be adjusted to the level desired by the addition of water or by the removal of water by distillation. Generally, the desired level of polymeric solids content is from about 20-60% by weight on a total weight basis. The size of the polymer particles can vary; however, for optimum pressure sensitive characteristics, it is preferable that the particles have an average diameter of less than 350 nanometers. Suitable particle sizes can generally be achieved directly from the polymerization. However, screening of the resulting latex to remove particles outside the desired size range and to thus narrow the particle size distribution may be employed.

For various applications, it is sometimes desirable to have small amounts of additives, such as, surfactants, bactericides (e.g., formaldehyde), pH modifiers, and antifoamers, incorporated in the latex, and this may be done in a conventional manner and at any convenient point in the preparation of the latexes.

The following examples will illustrate the invention, but should not be deemed to limit it. The test procedures for determining redispersibility and adhesive and cohesive properties are set out at the end of the examples.

EXAMPLES

| Example 1: Preparation of a Redispersible Latex | | |
|---|---|---|
| Reagents: | | |
| A. | Deionized water | 255 grams |
| | Sodium Acetate (buffer) | 0.675 grams |
| | PEG 8000 (plasticizer) | 90 grams |
| | Aerosol MA (anionic surfactant) | 1.5 grams |
| | Abex 26S (anionic surfactant) | 1.35 grams |
| | Siponic L4 (nonionic surfactant) | 3.0 grams |
| B. | 2-Ethylhexyl acrylate | 24 grams |
| | Vinyl acetate | 6 grams |
| C. | Sodium Persulfate | 0.3 grams |
| | Deionized Water | 4.0 grams |
| D.1 | Deionized Water | 66 grams |
| | Abex 26S | 13.8 grams |
| | Sodium Vinyl Sulfonate (stabilizing comonomer) | 3.0 grams |
| D.2 | 2-Ethylhexyl Acrylate | 205.5 grams |
| | Vinyl Acetate | 45.0 grams |
| | Monooctyl Maleate | 30.0 grams |
| | Acrylic Acid | 1.5 grams |
| | Siponic L4 | 3.0 grams |
| E. | Deionized Water | 24 grams |
| | Sodium Persulfate (initiator) | 0.75 grams |
| | Ammonium Hydroxide (neutralizing agent) | 9.9 grams |
| F. | t-Butyl Hydroperoxide (scavenger) | 0.3 grams |
| | Deionized Water | 1.0 grams |
| G. | Sodium Metabisulfite (reducing agent) | 0.6 grams |
| | Deionized Water | 4.5 grams |

Abex 26S is an alkyl phenol ether sulfate from Rhone-Poulenc. Aerosol MA 80 is a dihexyl ester of sodium sulfosuccinic acid from American Cyanamid. Siponic L-4 (Rhodasurf L 4) is a polyoxyethylene (4) lauryl alcohol from Rhone-Poulenc. PEG 8000 is a polyethylene glycol, molecular weight 8,000, from Union Carbide.

The surfactants and plasticizer in A were charged to a 2000 ml round bottom flask equipped with a stirrer, reflux condenser, two addition funnels and a thermometer, and a water bath and heat source.

The reagents of the initial monomer charge B were added to the flask and the mixture heated to 60° C. At 60° C. the initiator solution C was added to the reaction flask to initiate the formation of a polymer seed. The reaction was allowed to proceed and the temperature allowed to increase to 74° C. At 74° C. the monomer mixture with surfactant, in D.1 and D.2, and the initiator and neutralizing agent in E were added simultaneously and uniformly over the course of four hours while maintaining the reaction temperature at 74°-76° C. At the end of the addition of reagent mixtures D & E, the reaction was held at the reaction temperature for 45 minutes.

At the end of the hold period, reagent solution F (monomer scavenger initiator) was added to the reaction flask in one shot. The reducing agent, solution G, was then added over the course of 15 minutes. The latex was cooled to 30° C. and discharged.

The PEG plasticizer was present in an amount of 30 parts per hundred parts of monomer. The carboxylic acid functionality was neutralized to 100%. The resulting emulsion polymer was used as the base polymer in the following examples and has the monomer composition in parts by weight: 76.5 parts 2 ethyl hexyl acrylate/17 parts vinyl acetate/10 parts mono-octyl maleate/0.5 parts acrylic acid.

EXAMPLE 2

Effect of Neutralizing Agent and Sequence of Neutralization. A series of polymers with the monomer composition of Example 1 was prepared to test the effect of neutralizing agent and order of neutralization. Using the polymerization method of Example 1, sodium hydroxide and ammonium hydroxide were each used to neutralize the carboxylic acid monomer content concurrently with polymerization. For comparison, the carboxylic acid monomer content was neutralized after polymerization. The resulting polymers were tested for redispersibility and adhesive and cohesive properties. The results are set out in Table I and show that neutralization with ammonium hydroxide gives better redispersibility and slightly better adhesive and cohesive properties to the polymers than sodium hydroxide. The data also show that neutralization concurrently with polymerization results in superior redispersibility and pressure sensitive properties than neutralization after polymerization.

TABLE I

| Effect of Neutralizing Agent and Sequence of Neutralization | | |
|---|---|---|
| | NaOH | NH₄OH |
| Pre-Neutralization | | |
| Redispersibility | 78% | 82% |
| 180° Peel (N/m) | | |
| 20 min | P.T. | P.T. |
| 24 hrs | P.T. | P.T. |
| Loop Tack (N/m) | 208 | 438 |
| Quick Stick (N/m) | 120 | 175 |
| Shear Hold (hrs) | 35 | 300+ |
| Post-Neutralization | | |
| Redispersibility | 62% | 48% |
| 180° Peel (N/m) | | |
| 20 min | 55 | P.T. |
| 24 hrs | 120 | P.T. |
| Loop Tack (N/m) | 0 | 425(A.T., P.T.) |
| 90 Quick Stick (N/m) | 0 | 186 |
| Shear Hold (hrs) | 67+ | 67+ |

P.T. = paper tear
A.T. = adhesive transfer

EXAMPLE 3

Effect of Molecular Weight of PEG and of Substituents on PEG. A series of polymers with the monomer composition of Example 1 was prepared by the method of Example 1 in the presence of polyethylene glycol (PEG) plasticizers with varying molecular weight and substituents. The polymers were tested for redispersibility and adhesive and cohesive properties. The results are set out in Table II and show that redispersibility improves with increasing molecular weight of PEG and that unsubstituted PEG gives superior adhesive and cohesive properties to the polymers compared to PEG substituted with methyl.

TABLE II

| Effect of PEG Molecular Weight | | | | |
|---|---|---|---|---|
| PEG/mol. wt. | 1000 | 3500 | 4600 | 8000 |
| Redispersibility | 50% | 87% | 75% | 82% |
| Loop Tack (N/m) | 131 | 307 | 295 | 426 |
| Quick Stick (N/m) | 77 | 175 | 142 | 218 |
| 180° Peel (N/m) | | | | |
| 20 min | 113 | P.T. | P.T. | P.T. |
| 24 hrs | 131 | P.T. | P.T. | P.T. |
| Shear Hold (hrs) | 1 min | 14.5 | 24.5 | 300+ |

| Effect of Substituted PEG | | | |
|---|---|---|---|
| PEG/mol. wt. | PEG/8000 | MPEG/2000 | MPEG/5000 |
| Redispersibility | 82% | 86% | 92% |
| Loop Tack (N/m) | 426 | 405 | 175 |
| Quick Stick (N/m) | 218 | 186 | 98 |
| 180° Peel (N/m) | | | |
| 20 min | P.T. | P.T. | 219 |
| 24 hrs | P.T. | P.T. | 525 |

TABLE II-continued

| | | | |
|---|---|---|---|
| Shear Hold (hrs) | 300+ | 3 | 0.6 |

P.T. = paper tear
MPEG = methyl substituted PEG

EXAMPLE 4

A series of emulsion polymers with the monomer composition of Example 1 was prepared by the method of Example 1 with the exception that PEG was not present during the polymerization. Instead PEG with a molecular weight of 8000 was post-added to the emulsion after polymerization and the resulting compositions tested for redispersibility and adhesive and cohesive properties. The results are set out in Table III and show that the post-addition of PEG results in no pressure sensitive properties. The results also show that more parts per hundred monomer PEG is required to give redispersibility than is required when polymerization occurs in the presence of the PEG.

TABLE III

| Effect of PEG Post Addition | | | | | |
|---|---|---|---|---|---|
| PEG, pph | 0 | 15 | 30 | 45 | 60 |
| Redispersibility | 7% | 46% | 57% | 65% | 74% |
| Loop Tack (N/m) | 383 | 44 | No Tack | No Tack | No Tack |
| Quick Stick (N/m) | 164 | 16 | — | — | — |
| 180° Peel (N/m) | | | | | |
| 20 min | 438 | 367 | — | — | — |
| 24 hrs | P.T. | P.T. | — | — | — |
| Shear Hold (hrs) | 0.44 | 0.3 | — | — | — | pph = parts per hundred polymer

EXAMPLE 5

A series of polymer emulsions having the same monomer content as that of Example 1 was prepared by the method of Example 1 with the exception that the type and amount of acid was varied at 22, 44, and 66 milliequivalents (meq) per 100 grams of monomer. The resulting polymers were tested for redispersibility and adhesive and cohesive properties. The results are set out in Table IV and show that increasing the milliequivalents of acid will increase redispersibility and that superior pressure sensitive properties are obtained with acrylic acid and mono-octyl maleate.

TABLE IV

| Effect of Acid Amount | | | |
|---|---|---|---|
| Acid* | 22 meq | 44 meq | 66 meq |
| Redispersibility | 65% | 82% | 94% |
| Loop Tack (N/m) | 426 | 426 | 285 |
| Quick Stick (N/m) | 218 | 208 | 120 |
| 180° Peel (N/m) | | | |
| 20 min | P.T. | P.T. | 291 |
| 24 hrs | P.T. | P.T. | 332 |
| Shear Hold (hrs) | 300+ | 300+ | 6 min. |

*The acid amounts are given as milliequivalents per 100 grams of monomer.

| Effect of Varying Carboxylic Acid | | | | |
|---|---|---|---|---|
| Acid* | 44 meq monooctyl maleate | 44 meq itaconic acid | 44 meq acrylic acid | 44 meq monoethyl maleate |
| Redispersibility | 82% | 52% | 56% | 80% |
| Loop Tack (N/m) | 426 | 55 | 252 | 98 |
| Quick Stick (N/m) | 208 | 44 | 131 | 98 |
| 180° Peel (N/m) | | | | |
| 20 min | P.T. | 106 | 547 | 332 |

-continued

| | Effect of Varying Carboxylic Acid | | | |
|---|---|---|---|---|
| Acid* | 44 meq monooctyl maleate | 44 meq itaconic acid | 44 meq acrylic acid | 44 meq monoethyl maleate |
| 24 hrs | P.T. | 87 | P.T. | 332 |
| Shear Hold (hrs) | 300+ | 0.3 | 300+ | 11.5 |

*The acid amounts are given as milliequivalents per 100 grams of monomer.

EXAMPLE 6

A series of polymer emulsions was prepared to test the effect of the amount of PEG on the polymer properties. The PEG was varied at 30 and at 40 parts per hundred monomer. The polymers had the same monomer content as that of Example 1, with the exception that the amount of mono-octyl maleate was varied at 44 and 22 milliequivalents per 100 grams of monomer. The resulting polymers were tested for redispersibility and adhesive and cohesive properties. The results are set out in Table V and show that increasing the amount of PEG improves redispersibility, but reduces cohesion.

TABLE V

| | Effect of PEG Amount | |
|---|---|---|
| | 30 pphm | 40 pphm |
| PEG/8000 at 44 meq acid* | | |
| Redispersibility | 82% | 94% |
| Loop Tack (N/m) | 426 | 240 |
| Quick Stick (N/m) | 208 | 109 |
| 180° Peel (N/m) | | |
| 20 min | P.T. | P.T. |
| 24 hrs | P.T. | P.T. |
| Shear Hold (hrs) | 300+ | 16 |
| PEG/8000 at 22 meq acid* | | |
| Redispersibility | 65% | 84% |
| Loop Tack (N/m) | 426 | 175 |
| Quick Stick (N/m) | 208 | 55 |
| 180° Peel (N/m) | | |
| 20 min | P.T. | P.T. |
| 24 hrs | P.T. | P.T. |
| Shear Hold (hrs) | 300+ | 10 |

*per 100 grams of monomer

EXAMPLE 7

The polymer emulsion of Example 1 was prepared by the method in Example 1 and neutralized to two pH levels, pH 5.0 and 6.7. The pH had no effect on redispersibility or on adhesive or cohesive properties; however, grit was reduced at the lower pH level. The results are set out in Table VI.

TABLE VI

| | Effect of Neutralization pH | |
|---|---|---|
| pH | 6.7 | 5.0 |
| Grit | 0.05% | 0.025% |
| Redispersibility | 82% | 86% |
| Loop Tack (N/m) | 426 | 383 |
| Quick Stick (N/m) | 208 | 164 |
| 180° Peel (N/m) | | |
| 20 min | P.T. | P.T. |
| 24 hrs | P.T. | P.T. |
| Shear Hold (hrs) | 300+ | 300+ |

EXAMPLE 8

The polymer emulsion of Example 2 was prepared with a commercial tackifier (Snowtack, a product of Eka Nobel, Woodstock, Conn.), and tested for redispersibility and adhesive and cohesive properties. The results are set out in Table VII and show that the addition of the tackifier causes no loss of redispersibility.

TABLE VII

| | Effect of the Addition of Tackifier | | |
|---|---|---|---|
| Snowtack 301 A/pph | 0 | 7 | 14 |
| Redispersibility | 78% | 84% | 85% |
| Loop Tack (N/m) | 263 | 383 | 427 |
| Quick Stick (N/m) | 120 | 186 | 186 |
| 180° Peel (N/m) | | | |
| 20 min | P.T. | 470 | 492 |
| 24 hrs | P.T. | 657 | 678 |
| Shear Hold (hrs) | 30 | 1.2 | 0.4 |

*pph = parts per hundred polymer

TEST PROTOCOLS

Loop Tack

This test measures the tackiness of pressure sensitive adhesive coatings using a TMI Loop Tack Testor Model #8-16. A strip of 60 KK paper facestock, 2.54 cm × 12.5 cm, coated with adhesive to 25 micrometers thickness is bent back on itself forming a tear drop shaped loop and the ends are taped together to form a flat adhesive surface, 2.54 × 2.54 cm² area, for contact with a steel test surface. The tape is clamped into the tester, contacted with the test surface for 1 second, and then vertically removed at a speed of 30.5 cm/minute. The force of removal is measured and reported in N/m width.

180° Peel Test

The adhesive surface of a 2.54 cm × 15 cm strip of 60 KK paper facestock coated with adhesive to 25 micrometers thickness is placed in contact with a steel panel and rolled down with 2 passes of a 2 kg roller. After 20 minutes of dwell time, the coated facestock is removed at 180 degrees to the panel surface at a speed of 30.5 cm/minute and the force of removal is measured and reported in N/m width. Further details of this test are found in the test methods for Pressure Sensitive Tapes, Test PSTC-1.

Quick Stick

The adhesive surface of 2.54 cm × 12.7 cm strip of 60 KK paper facestock is lightly placed in contact with a 5 cm × 12.5 cm steel panel and removed at 90° to the panel surface at a speed of 30.5 cm/minute. The force of removal is measured and reported in N/m width. Further details of this test are found in the Test Methods for Pressure Sensitive Tapes Test PSTC-5.

Shear Adhesion

A 2.54 cm × 2.54 cm end portion of a 2.54 cm × 15 cm tape of 60 KK paper facestock coated with adhesive to 25 micrometer thickness is adhered to a stainless steel test panel and rolled down with two passes of a 2 kg roller. After 15 minutes of dwell time, the panel is then clamped in a jig disposed at 2° to the vertical so that the 12.5 cm free end of the tape extends downward at an angle of 178° to the test panel. A 1000 gram weight is attached to the tape end and the time for the tape to separate from the panel is reported in hours, the shear strength being directly related to the lapsed time. Further details are found in the Test Methods for Pressure Sensitive Tapes, Test PSTC-7.

Redispersibility Tappi UM666

This test is used to quantify the degree of redispersibility of adhesives in water and gives a more exact evaluation of the repulping potential of adhesive contaminated scrap compared to Tappi 213, which involves a qualitative repulping test. The adhesive for testing is prepared by forming a film of adhesive approximately 25 micrometers thick. Approximately 1.0 g of the dry adhesive film is added to 700 ml of distilled water at about 49° C. in a Waring blender. This mixture is agitated at high speed for 5 minutes. The solution is filtered through a 60 mesh metal wire screen and the percent adhesive dispersed is calculated as follows:

$$\frac{\text{Weight of sample} - \text{Amount retained on screen}}{\text{Weight of sample}} \times 100 = \% \text{ Adhesive Dispersed}$$

Further details are found in Tappi UM666.

We claim:

1. A method for preparing a polymer for use as a water redispersible pressure sensitive adhesive that comprises:
   (A) providing the following monomers:
      (a) one or more ethylenically unsaturated carboxylic acid monomers, present in an amount to give 10-75 milliequivalents of carboxylic acid functionality per 100 grams of total monomer content,
      (b) 60-85 parts by weight of one or more ($C_1$-$C_{12}$) alkyl acrylate or methacrylate monomers, and
      (c) optionally, 5-30 parts by weight of one or more vinyl containing monomers, and
   (B) first neutralizing 50-100% of the acidity of the carboxylic acid monomers and then emulsion polymerizing the monomers in the presence of 10-50 parts per hundred parts of monomer of a polyalkylene oxide plasticizer having a molecular weight greater than 3000; or
   (C) concurrently neutralizing 50-100% of the acidity of the carboxylic acid monomers while emulsion polymerizing the monomers in the presence of 10-50 parts per hundred parts of monomer of a polyalkylene oxide plasticizer having a molecular weight greater than 3000; or
   (D) first neutralizing about 10-50% of the acidity of the carboxylic acid monomers; then concurrently neutralizing the remaining carboxylic acid monomers to a total of 50-100% of the acidity while emulsion polymerizing the monomers in the presence of 10-50 parts per hundred parts of monomer of a polyalkylene oxide plasticizer having a molecular weight greater than 3000.

2. The method of claim 1 in which the ethylenically unsaturated carboxylic acid monomers are present in an amount to give 40-60 milliequivalents of carboxylic acid functionality per 100 grams of total monomer content.

3. The method of claim 1 in which the carboxylic acid monomers are selected from the group consisting of ethylenically unsaturated $C_3$-$C_8$ monocarboxylic acids and ethylenically unsaturated $C_4$-$C_{12}$ dicarboxylic acids.

4. The method of claim 3 in which the carboxylic acid monomers are selected from the group consisting of acrylic, methacrylic, crotonic, maleic, itaconic, and fumaric acids, and their monoalkyl esters and anhydrides, and combinations of those.

5. The method of claim 1 in which the ($C_1$-$C_{12}$) alkyl acrylates and methacrylates are selected from the group consisting of butyl acrylate and 2-ethyl hexyl acrylate.

6. The method of claim 1 in which the ($C_1$-$C_{12}$) alkyl acrylates and methacrylates are present in an amount from 70 to 80 parts by weight of total monomer content.

7. The method of claim 1 in which the vinyl containing monomers are selected from the group consisting of vinyl acetate, vinyl pivalate, vinyl propionate, vinyl butyrate, acrylonitrile, methacrylonitrile, acrylamide, methacrylamide, styrene, ethylene, vinyl chloride, vinylidene chloride, and the ($C_{1-C12}$)-dialkyl esters of dibasic unsaturated $C_4$-$C_{12}$ dicarboxylic acids and combinations of those.

8. The method of claim 1 in which the vinyl containing monomers are present in an amount from 10 to 20 parts by weight of total monomer content.

9. The method of claim 1 in which the polyalkylene oxide plasticizer is polyethylene glycol, polypropylene glycol, or a copolymer of ethylene oxide and propylene oxide.

10. The method of claim 1 in which the polyalkylene oxide plasticizer is present in the amount of 20-40 parts per 100 parts of monomer.

11. The method of claim 1 in which the neutralizing agent is sodium hydroxide or ammonium hydroxide.

12. A water redispersibility pressure sensitive adhesive polymer made by the method of claim 1.

* * * * *